3,143,540
AZO DYES FROM AMINOISOTHIAZOLES
Ronald H. Meen, William H. Moore, and Joseph B. Dickey, Kingsport, Tenn., assignors to Eastman Kodak Company, Rochester, N.Y., a corporation of New Jersey
No Drawing. Filed Sept. 12, 1962, Ser. No. 223,247
9 Claims. (Cl. 260—155)

This invention relates to novel azo compounds and particularly to their application to the art of dyeing or coloring.

The compounds have the following formula

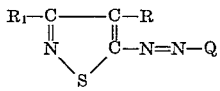

wherein

R=either a hydrogen atom or a nitro group
$R_1$=a hydrogen atom or a lower alkyl group including methyl, ethyl, propyl or butyl straight or branch-chained, and
Q=a coupling component residue including aniline, benzomorpholine and tetrahydroquinoline coupling component residues.

These azo compounds are prepared by diazotization of 5-aminoisothiazoles and coupling the diazonium compound obtained with the mentioned coupling components in known manner. Representative 5-aminoisothiazoles useful in preparing the compounds are as follows:

5-amino-3-methyl-4-nitroisothiazole
5-amino-3-methylisothiazole
5-amino-3-propylisothiazole
5-amino-3-butyl-4-nitroisothiazole
5-amino-4-nitroisothiazole While the preferred azo compounds are obtained from the 5-aminoisothiazoles, useful azo compounds can be obtained in the same manner from the isomeric 4-aminoisothiazoles prepared as described by Adams and Slack, J. Chem. Soc., 3061–72 (1959), and Chem. and Ind., 1232 (1956).

The 5-aminoisothiazoles are prepared as described in detail in the examples by the oxidative cyclization of 3-iminothioalkylamides such as 3-iminothiobutyramide,

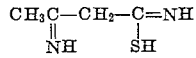

and in the case of the nitro derivatives, by acylating and nitrating the 5-aminoisothiazoles.

The aniline coupling components useful with the diazotized aminoisothiazoles include well known anilines such as those described in the table below. Heterocyclic couplers can be used including tetrahydroquinolines such as N-glyceryl-2,7-dialkyl-1,2,3,4-tetrahydroquinoline, and benzomorpholines such as N-glyceryl-2-alkylbenzomorpholines and 2,7 - dialkylbenzomorpholines described below.

The compounds of the invention are particularly useful for dyeing hydrophobic polymer textile materials such as polyamide, polyester and acrylic polymer fibers, yarns and fabrics, producing a wide range of colors thereon having good fastness. When the azo compounds are used for deying such hydrophobic materials, they should be free of water-solubilizing substituents such as carboxyl and sulfonic acid groups. Conventional dyeing methods may be used for dyeing such fibers.

The preparation of representative 5-aminoisothiazoles and azo compounds therefrom is illustrated by the following examples.

EXAMPLE 1.—PREPARATION OF 5-AMINO-3-METHYLISOTHIAZOLE

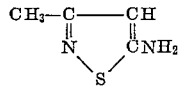

3-iminobutyronitrile was prepared in 49% yield, M.P. 40–60° C. by dimerization of acetonitrile with sodium [J. Moir, J. Chem. Soc., 81, 100 (1902)]. This product on treatment in pyridine solution with hydrogen sulfide was converted in 69% yield to 3-iminothiobutyramide, M.P. 137–139° C. [A. Adams and R. Slack, J. Chem. Soc., 3061 (1959)]. Oxidative cyclization of 3-iminothiobutyramide with ammonium persulfate, at a pH greater than 9, gave a 53% yield of 5-amino-3-methylisothiazole, M.P. 48–53° C. [A. Adams and R. Slack, J. Chem. Soc., 3061 (1959), U.S. Patent 2,871,243, Jan. 27, 1959, Example III].

EXAMPLE 2.—PREPARATION OF 5-AMINO-3-METHYL-4-NITROISOTHIAZOLE

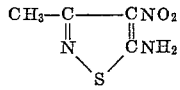

Acylation of 5-amino-3-methylisothiazole with dichloroacetyl chloride gave a 64% yield of 5-dichloroacetamido-3-methylisothiazole, M.P. 185–188° C., which on nitration with mixed acid gave a quantitative yield of 5-dichloroacetamido-3-methyl - 4 - nitroisothiazole, M.P. 86–88° C., and which on hydrolysis with dilute hydrochloric acid gave an 86% yield of 5-amino-3-methyl-4-nitroisothiazole, M.P. 176–179° C. [A. Adams and R. Slack, J. Chem. Soc., 3061 (1959)].

EXAMPLE 3.—AZO DYES FROM 5-AMINO-3-METHYL-4-NITROISOTHIAZOLE

A. Diazotization

Nitrosylsulfuric acid was prepared by adding 0.76 g. (0.011 mole) of sodium nitrite, portionwise, to 5 ml. of concentrated sulfuric acid with stirring and allowing the temperature to rise to 65° C. The solution was then cooled to 5° C., and 10 ml. of a mixture of 1.4 ml. of propionic acid and 8.6 ml. of acetic acid was added dropwise with stirring, allowing the temperature to rise to 15° C. and keeping it there during the addition. The solution was cooled to 0–5° C. and 1.59 g. (0.010 mole) of 5-amino-3-methyl-4-nitroisothiazole was added portionwise while stirring, after which 10 ml. more of the propionic acetic acid mixture was added at once and an additional 10 ml. added after 75 minutes, keeping the temperature at 0–5° C. The reaction mixture was then stirred at 0–5° C. for 60 minutes more and the excess nitrosylsulfuric acid was destroyed by adding about 0.1 g. of urea. The diazonium salt solution was then coupled as follows.

B. Coupling

To a solution of 0.42 g. (0.002 mole) of N-ethyl-N-glyceryl-m-toluidine in 6 ml. of propionic acetic acid mixture cooled to 0° C. was added with stirring one-fifth (0.002 mole) of the above diazonium salt solution (A) at such a rate that the temperature remained at 0–5° C. After 15 minutes at 0–5° C., the reaction mixture was neutralized to Congo red with anhydrous sodium acetate. The resulting mixture was taken up in water, filtered and washed with water yielding 0.32 g. (42%) of the azo dye.

The dye colored textile materials such as cellulose ester fibers, polyamide fibers and acrylic fibers violet-blue shades, and polyester fibers and polypropylene fibers were colored violet shades. With the same diazonium salt and N,N-di-β-hydroxy-ethyl-2-methoxy-5-acetamido - aniline the above fibers were dyed blue-green.

EXAMPLE 4

Following the procedure described in Example 3(B), 0.47 g. (0.002 mole) of N-glyceryl-2,7-dimethyl-1,2,3,4-tetrahydroquinoline was coupled with 0.002 mole of the diazonium salt prepared in Example 3(A). There was obtained 0.36 g. (44%) of a dye which colored cellulose ester, polyamide and acrylonitrile polymer fibers deep blue shades and which colored polyester and polypropylene fibers blue-violet shades.

EXAMPLE 5

Proceeding as in Example 3(B), 0.41 g. (0.002 mole) of N-(β-cyanoethyl)-N-(β-hydroxyethyl)-m-toluidine was coupled with 0.002 mole of the diazonium salt prepared in Example 3(A); to yield 0.36 g. (48%) of dye. The dye colored polyester and polypropylene fibers deep red-violet shades, cellulose ester and acrylonitrile polymer fibers deep violet shades and polyamide fibers blue-violet shades.

EXAMPLE 6

Following the procedure in Example 3(B), 0.002 mole of the diazonium salt prepared in Example 3(A) was coupled with 0.44 g. (0.002 mole) of N-(β-acetoxyethyl)-N-ethyl-m-toluidine. The dye obtained colored cellulose ester, polyamide and acrylonitrile polymer fibers deep blue-violet shades and polyester and polypropylene fibers deep violet shades.

EXAMPLE 7

Proceeding as in Example 3(B), 0.002 mole of the diazonium salt prepared in Example 3(A) was coupled with 0.57 g. (0.002 mole) of (N-ethylanilino)ethyl phenylcarbamate. The dye obtained colored the polypropylene fibers deep red-violet shades, cellulose ester and acrylonitrile polymer fibers deep violet shades, and polyamide fibers a blue-violet shade.

EXAMPLE 8.—AZO DYES FROM 5-AMINO-3-METHYLISOTHIAZOLE

A. A diazonium salt solution was prepared from 2.28 g. (0.020 mole) of 5-amino-3-methylisothiazole by the procedure of Example 3(A).

B. 0.002 mole of the diazonium salt prepared above was coupled with 0.42 g. (0.002 mole) of N-ethyl-N-glyceryl-m-toluidine, following the procedure of Example 3(B). There was obtained 0.58 g. of dye (87%), which dyed the above fibers orange shades.

EXAMPLE 9

0.41 g. (0.002 mole) of N-(β-cyanoethyl)-N-(β-hydroxyethyl)-m-toluidine was coupled with 0.002 mole of the diazonium salt from Example 8(A), following the procedure of Example 3(B). The dye weighed 0.56 g. (85%); it dyed the fibers orange shades.

EXAMPLE 10

Proceeding as in Example 3(B), 0.002 mole of the diazonium salt from Example 8(A) was coupled with 0.44 g. (0.002 mole) of N-(β-acetoxyethyl)-N-ethyl-m-toluidine. The dye dyed the fibers orange shades.

EXAMPLE 11.—AZO DYES FROM 4-AMINO-3-METHYLISOTHIAZOLE

A diazonium solution from 4-amino-3-methylisothiazole was prepared as in Example 8. Coupling with N-(β-acetoxyethyl)-N-ethyl-m-toluidine as in Example 10 yielded a dye which gave bright yellow-orange shades on the above fibers.

The following table further illustrates the new azo compounds of the invention and the color of dyeings on a polyester textile material. The compounds are prepared in the manner of the above examples by diazotization of the indicated isothiazole and coupling with the indicated coupling components.

| Diazonium | Coupling component | Color on a polyester fiber |
|---|---|---|
| 5-amino-3-methyl-4-nitroisothiazole. | N,N-di-β-hydroxyethyl-m-chloroaniline. | Violet. |
| | N,N-di-β-hydroxyethyl-2-methoxy-5-acetamidoaniline. | Blue. |
| | N-(β,β-difluoroethyl)-N-β-hydroxyethylaniline. | Red-violet. |
| | N-β-cyanoethyl-N-β-hydroxyethylaniline. | Do. |
| | N-ethyl-N-β-hydroxyethylaniline. | Violet. |
| | N-ethyl-N-β-hydroxyethyl-m-toluidine. | Do. |
| | N,N-di-β-hydroxyethylaniline. | Do. |
| | N-β-hydroxyethyl-o-chloroaniline. | Violet-red. |
| | N-β-hydroxyethyl-m-chloroaniline. | Do. |
| | N-β-cyanoethyl-2,5-dichloroaniline. | Do. |
| | N-ethyl-N-β-cyanoethylaniline. | Violet. |
| | N-ethyl-N-β-cyanoethyl-m-toluidine. | Do. |
| | N-benzyl-N-β-cyanoethylaniline. | Do. |
| | N-β-hydroxyethyl-N-(β-methoxycarbonyl)-ethyl-m-chloroaniline. | Do. |
| | N-glyceryl-N-(β-methoxycarbonyl)-ethyl-m-chloroaniline. | Do. |
| | N-β-cyanoethyl-m-toluidine. | Red-violet. |
| | N-β-cyanoethyl-N-β-acetoxyethylaniline. | Do. |
| | N-β-hydroxyethyl-N-β-(methane-sulfonyl-ethyl)-aniline. | Blue-violet. |
| | N-β-cyanoethyl-N-β-hydroxyethyl-o-anisidine. | Violet. |
| | N-β-cyanoethylaniline. | Red-violet. |
| | N,N-di-β-cyanoethyl-m-toluidine. | Do. |
| | N,N-di-n-butyl-m-toluidine. | Violet. |
| | N-β-cyanoethyl-N-(β-methane-sulfonamidoethyl) aniline. | Red-violet. |
| | N-β-cyanoethyl-2,7-dimethyl-1,2,3,4-tetrahydroquinoline. | Violet-Blue. |
| | N-β-cyanoethyl-N-cyclohexylaniline. | Violet. |
| | N-β-cyanoethyl-3-methoxy-diphenylamine. | Violet-blue. |
| | N-glyceryl-2,7-dimethylbenzo-morpholine. | Blue. |
| | N-glyceryl-2-methylbenzo-morpholine. | Do. |
| | N-glyceryl-N-cyclohexylaniline. | Do. |
| | N-ethyl-N-cyclohexylaniline. | Violet. |
| | N-β-hydroxyethyl-N-cyanomethylaniline. | Blue-violet. |
| | N-(β-methanesulfonamidoethyl) aniline. | Violet. |
| | N-β-hydroxyethyl-N-β-methane-sulfonamidoethyl) aniline. | Violet-blue. |
| | N,N-di-β-hydroxyethyl-2-methoxy-5-chloroaniline. | Blue. |
| 5-amino-3-butyl-4-nitro-isothiazole. | N-β-cyanoethylaniline. | Do. |
| 5-amino-3-methyl-4-nitroisothiazole. | β-(N-methyl-m-toluidino)ethyl phenylcarbamate. | Violet. |
| | β-(N-β-cyanoethyl-m-toluidino) ethyl phenylcarbamate. | Red-violet. |
| | m-Cresol. | Yellow-orange |
| | Hydroquinone mono (n-butyl) ether. | Do. |
| | N-β-phosphatoethyl-N-β-hydroxyethylaniline. | Red-violet. |
| | N-β-sulfatoethyl-N-β-hydroxyethylaniline. | Do. |
| | N-γ-sulfatopropyl-N-β-hydroxyethylaniline. | Do. |
| | N-β-sulfoethyl-N-β-hydroxyethylaniline. | Do. |
| | N-ethyl-N-(3-chloro-2-hydroxypropyl)-m-toluidine. | Violet. |
| | N-γ-chloroallyl-N-glyceryl-m-toluidine. | Red-violet. |
| 5-amino-3-methyl-isothiazole. | N-ethyl-N-β-cyanoethyl-m-toluidine. | Yellow-orange. |
| | N-ethyl-N-β-cyanoethylaniline. | Do. |
| | N,N-di-β-hydroxyethyl-m-toluidine. | Orange. |
| | N,N-di-β-hydroxyethylaniline. | Yellow-orange. |
| | N,N-di-β-hydroxyethyl-m-chloroaniline. | Do. |
| | N-glyceryl-2,7-dimethyl-1,2,3,4-tetrahydroquinoline. | Pink. |
| | N-glyceryl-2,7-dimethylbenzo-morpholine. | Do. |
| | N-methyl-diphenylamine. | Orange. |
| | N-benzyl-N-ethylaniline. | Do. |

| Diazonium | Coupling component | Color on a polyester fiber |
|---|---|---|
| 5-amino-3-methyl-isothiazole. | N-ethyl-N-(β-methanesulfonamidethyl)-m-toluidine. | Yellow-orange. |
| | β-(N-ethylanilino)ethylphenylcarbamate. | Do. |
| | N,N-di-β-hydroxyethyl-2-methoxy-5-acetamidoaniline. | Red-pink. |
| | N-(β,β-difluoroethyl)-N-β-hydroxyethyl-m-toluidine. | Orange.-yellow. |
| | N-glyceryl-N-(β-methoxycarbonyl)ethyl-m-chloroaniline. | Orange. |

The dyes of the invention obtained from the 5-aminoisothiazoles are readily distinguished from similar dyes obtained by diazotizing and coupling 2-aminothiazoles, which are fundamentally different in structure.

The invention has been described in considerable detail with particular reference to certain preferred embodiments thereof, but it will be understood that variations and modifications can be effected within the spirit and scope of the invention as described hereinabove, and as defined in the appended claims.

What we claim is:

1. Monoazo compounds having the general formula

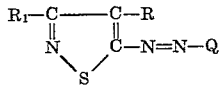

wherein
R=a member of the class consisting of a hydrogen atom and a nitro group,
R₁=a member of the class consisting of a hydrogen atom and a lower alkyl group and
Q=a member of the class consisting of the residue of an aniline coupling component, N-glyceryl-2,7-dimethylbenzomorpholine, N-glyceryl-2-methylbenzomorpholine and N-glyceryl-2,7-dimethyl-1,2,3,4-tetrahydroquinoline coupling component residues, said compounds being free of water-solubilizing carboxyl and sulfonic acid groups.

2. Monoazo compounds according to claim 1 wherein
R=a nitro group,
R₁=a lower alkyl group and
Q=the residue of an aniline coupling component,
said compounds being free of water-solubilizing carboxyl and sulfonic acid groups.

3. Monoazo compounds according to claim 1 wherein
R=hydrogen,
R₁=a lower alkyl and
Q=the residue of an aniline coupling component, said compounds being free of water-solubilizing carboxyl and sulfonic acid groups.

4. A compound having the formula

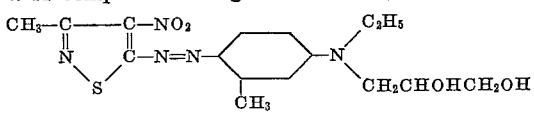

5. A compound having the formula

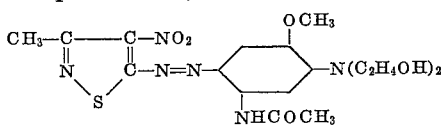

6. A compound having the formula

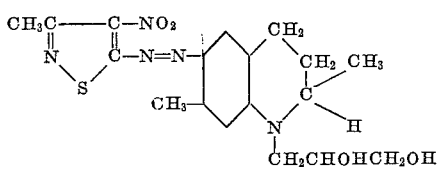

7. A compound having the formula

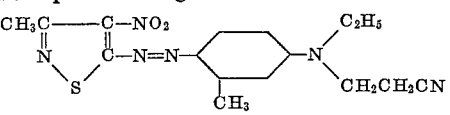

8. A compound having the formula

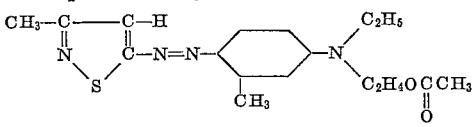

9. A compound having the formula

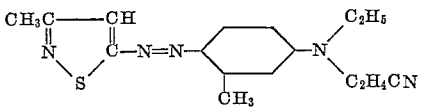

References Cited in the file of this patent

UNITED STATES PATENTS

| 2,659,719 | Dickey et al. | Nov. 17, 1953 |
| 2,771,466 | Towne et al. | Nov. 20, 1956 |
| 2,839,523 | Towne et al. | June 17, 1958 |
| 2,891,942 | Merian et al. | June 23, 1959 |

OTHER REFERENCES

Adams et al.: "J. Chem. Soc.," pages 3061–3072, 1959.